(12) United States Patent
Yang et al.

(10) Patent No.: US 8,993,157 B2
(45) Date of Patent: Mar. 31, 2015

(54) ACRYLONITRILE GRAFTED TO PVDF

(71) Applicants: Jin Yang, Pleasanton, CA (US); Hany Basam Eitouni, Oakland, CA (US); Yan Li, Fremont, CA (US)

(72) Inventors: Jin Yang, Pleasanton, CA (US); Hany Basam Eitouni, Oakland, CA (US); Yan Li, Fremont, CA (US)

(73) Assignee: Seeo, Inc., Hayward, CA (US)

( * ) Notice: Subject to any disclaimer, the term of this patent is extended or adjusted under 35 U.S.C. 154(b) by 19 days.

(21) Appl. No.: 13/745,834

(22) Filed: Jan. 20, 2013

(65) Prior Publication Data

US 2013/0202958 A1 Aug. 8, 2013

Related U.S. Application Data

(60) Provisional application No. 61/594,475, filed on Feb. 3, 2012.

(51) Int. Cl.
| | |
|---|---|
| *H01M 6/04* | (2006.01) |
| *H01M 4/62* | (2006.01) |
| *H01M 4/131* | (2010.01) |
| *H01M 4/136* | (2010.01) |
| *C08F 259/08* | (2006.01) |
| *H01M 4/525* | (2010.01) |

(52) U.S. Cl.
CPC ............. *H01M 4/623* (2013.01); *H01M 4/131* (2013.01); *H01M 4/136* (2013.01); *H01M 4/525* (2013.01); *C08F 259/08* (2013.01)
USPC ...................................................... 429/200

(58) Field of Classification Search
None
See application file for complete search history.

(56) References Cited

U.S. PATENT DOCUMENTS

| | | | | |
|---|---|---|---|---|
| 4,151,225 | A | | 4/1979 | Buning |
| 4,508,875 | A | * | 4/1985 | Kishida et al. ................. 525/308 |
| 7,615,522 | B2 | * | 11/2009 | Camenzind et al. ........... 508/469 |
| 2004/0234850 | A1 | * | 11/2004 | Watarai et al. ................. 429/217 |
| 2007/0026311 | A1 | * | 2/2007 | Obana et al. ................... 429/217 |
| 2007/0244262 | A1 | | 10/2007 | Zhang |
| 2008/0070116 | A1 | * | 3/2008 | Cho et al. ........................ 429/212 |
| 2010/0129704 | A1 | * | 5/2010 | Luo et al. ........................ 429/163 |
| 2010/0255378 | A1 | | 10/2010 | Bonnet |
| 2011/0315189 | A1 | * | 12/2011 | Ge et al. ......................... 136/244 |

FOREIGN PATENT DOCUMENTS

| | | |
|---|---|---|
| EP | 0 793 286 A1 | 9/1997 |
| EP | 1 381 097 A1 | 1/2004 |
| WO | 2010/054261 A1 | 5/2010 |

OTHER PUBLICATIONS

Cho, "Electrochemical Performances of Polyacrylonitrile Nanofiber-Based Nonwoven Separator for Lithium-Ion Battery," Electrochem. Solid-State Lett., V 10, P.A159, 2007.
Zhou, "Preparation and performances of porous polyacrylonitrile—methyl methacrylate membrane for lithium-ion batteries," Journal of Power Sources 184 (2008) 477-480.
J. F. Hester, "ATRP of Amphiphilic Graft Copolymers Based on PVDF and Their Use as Membrane Additives," Macromolecules 2002, 35, 7652-7661.
International Preliminary Report on Patentability for PCT/US2013/022343, issued Aug. 5, 2014.
Lin Xian-Kai, Feng Xia, Chen Li, "Synthesis and Characterization of Graft Copolymer PVDF-g-PNIPAAm via ATRP and Its Separating Membranes," published Feb. 28, 2010 Listed as: ATRP 法合成接枝共聚物 PVDF-g-PNIPAAm 及其分离膜的研究", 林先凯等, 高等学校化学学报, 第 31 卷, 第2期 2 第2期, 第 402-405 页, in a CN Office Action.

\* cited by examiner

*Primary Examiner* — Patrick Ryan
*Assistant Examiner* — Jose Colucci Rios
(74) *Attorney, Agent, or Firm* — R'Sue Popowich Caron

(57) ABSTRACT

PVDF-g-PAN has been synthesized by grafting polyacrylonitrile onto polyvinylidene fluoride using an ATRP/AGET method. The novel polymer is ionically conducive and has much more flexibility than PVDF alone, making it especially useful either as a binder in battery cell electrodes or as a polymer electrolyte in a battery cell.

5 Claims, No Drawings

ACRYLONITRILE GRAFTED TO PVDF

CROSS-REFERENCE TO RELATED APPLICATIONS

This application claims priority to U.S. Provisional Patent Application 61/594,475, filed Feb. 3, 2012, which is incorporated by reference herein.

STATEMENT OF GOVERNMENT SUPPORT

The invention described and claimed herein was made in part utilizing funds supplied by the U.S. Department of Energy under Contract No. DE-OE0000223. The U.S. Government has certain rights in this invention.

BACKGROUND OF THE INVENTION

1. Field of the Invention

This invention relates generally to a new polymer material, and, more specifically, to a new polymer material that has excellent oxidative stability up to about 5V (vs Li/Li+), making it suitable for use in high voltage electrochemical cells.

Conventionally, cathodes for lithium battery cells are made up of particles of cathode active material, bound together by polyvinylidene fluoride (PVDF). PVDF can also be used in anodes to bind together particles of anode active material. PVDF is electrochemically stable in contact with a wide variety of electrolytes and is oxidatively stable up to about 5.0 V (vs Li/Li+O.

Unfortunately, PVDF acts only as a binder in the cell. It is functionally inert and adds dead weight and volume. In addition, PVDF has a glass transition temperature ($T_g$) of about −35° C. and a melting temperature ($T_m$) of 160° C., so it is very hard at typical cell operating temperatures.

As rechargeable batteries find more and more applications, energy density and power density are critical. In an ideal situation, a cell would include no dead weight, i.e., it would contain only those elements that have electrochemical functions in the cell.

It would be very useful to find a binder material for use in cathodes and anodes, which can also provide some electrochemical function, thus increasing the energy density and/or power density of the cell. Another useful improvement would be for a binder to have some flexibility so that it can be resistant to fracture during cell use and thereby have a long lifetime.

SUMMARY

A new polymer material in which acrylonitrile is grafted to PVDF is disclosed. When combined with an appropriate salt (such as a lithium salt), the material can be used as an ionically conductive polymer to bind together active material particles in an electrode. The material can also be used as an electrolyte to facilitate ionic conduction between the electrodes in an electrochemical cell.

DETAILED DESCRIPTION

The preferred embodiments are illustrated in the context of binders for electrode active particles in electrochemical cells. The skilled artisan will readily appreciate, however, that the materials and methods disclosed herein will have application in a number of other contexts where high voltage stability and ionic conductivity are important.

The aforementioned needs are satisfied by the new polymer material of the present invention.

In this disclosure, the terms "negative electrode" and "anode" are both used to mean "negative electrode". Likewise, the terms "positive electrode" and "cathode" are both used to mean "positive electrode".

In one embodiment of the invention, a PVDF molecule has been modified with grafted polar groups to form a novel polymer that is ionically conductive. The novel polymer has the structure:

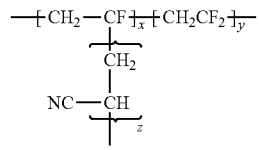

wherein x and y have a ratio, x/y, and x/y has a value between about 0.01 and 9, and z has a value between about 3 and 1000.

In one embodiment of the invention, the polar group is polyacrylonitrile (PAN). In another embodiment of the invention, the polar group can be one or more of cyano- containing and sulfone-containing monomers, which can form grafted polar groups such as poly(2-cyanoethyl acrylate), polyallylnitrile, or polyvinylsulfone.

In one arrangement, the PVDF-graft-PAN is ionically conductive when doped with a salt, such as a lithium salt. With the addition of grafted PAN (and a salt) the very stable PVDF binder changes into a very stable polymer electrolyte, while still maintaining its binder properties. In one arrangement, the molecular weight of the PAN is very low (e.g., between about 100 and 5000 Daltons), so that the $T_g$ of the polymer PVDF-g-PAN can also be low (e.g., less than about 60° C.).

Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, and mixtures thereof.

Without wishing to be bound to any particular theory, it seems that random grafting of PAN onto PVDF may disrupt the crystallization of the PVDF, so that the resulting material, PVDF-g-PAN, is much more flexible than PVDF alone. The high polarity of the grafted low molecular weight PAN chains aids in salt dissolution and, thus, in enhanced ionic conductivity.

PVDF-g-PAN can be synthesized using a variety of methods, including:
- plasma treatment of a PVDF surface followed by surface grafting of PAN monomers to PVDF
- ozone treatment of a PVDF surface followed by surface grafting of PAN monomers to PVDF
- introducing special functional groups to the PVDF and then using atom transfer radical polymerization (ATRP) to graft PAN monomers to PVDF functional groups The main drawbacks for the above-mentioned methods are that they require expensive and complicated pretreatment or that special functional groups have to be introduced before the grafting can proceed.

In one embodiment of the invention, PVDF-g-PAN is synthesized using a controlled free radical polymerization method, ATRP/AGET (activators generated by electron transfer). The method is both low-cost and simple. This is a one-step reaction using commercially available polymers as starting materials without complicated and expensive pressure reactors to handle gas monomers such as VDF.

In one embodiment of the invention, the synthesis involves the steps of:
- dissolving PVDF in a polar solvent;
- adding acrylonitrile to the PVDF solution;
- adding controlled radical initiators to the PVDF solution;
- allowing the acrylonitrile to react with the PVDF in an inert environment;
- precipitating the polymer solution in a non-solvent to yield acrylonitrile grafted onto PVDF As discussed above, examples of useful polar solvents include, but are not limited to, any one or more of polyacrylonitrile (PAN) cyano-containing monomers, sulfone-containing monomers, which can form grafted polar groups such as poly(2-cyanoethyl acrylate), polyallylnitrile, or polyvinylsulfone.

Examples of useful controlled radical initiators include, but are not limited to, any one or more of the system $CuCl_2$, Tin (II) 2-ethylhexanoate, and $Me_6Tren$ and the system CuCl and 4,4'-Dimethyl-2,2'-dipyridyl.

Examples of useful non-solvents for use in the precipitating step include, but are not limited to, any one or more of IPA, hexane, toluene, heptane, and water.

In one embodiment of the invention, PVDF-g-PAN is used as a binder in an electrode of an electrochemical cell. PVDF-g-PAN can be used to bind active material particles and optional electronically conductive particles in either a cathode or an anode.

In another embodiment of the invention, PVDF-g-PAN can be used as a polymer electrolyte to facilitate flow of ions back and forth between the anode and cathode of an electrochemical cell.

In another embodiment of the invention, one or more electrodes that use PVDF-g-PAN to bind together electrode active material particles can be used in an electrochemical cell, such as a battery or capacitor. Such a cell includes an anode, a cathode and a separator between the anode and the cathode. The separator can be a solid polymer electrolyte or it can be a membrane that has been soaked with a liquid electrolyte. The cell may also include current collectors in electronic communication with the anode and/or the cathode.

In another embodiment of the invention, a cathode that uses PVDF-g-PAN to bind together cathode active material particles can be used with a solid lithium or lithium alloy anode in an electrochemical cell, such as a battery or capacitor. The separator can be a solid polymer electrolyte or it can be a membrane that has been soaked with a liquid electrolyte. It is important to ensure that PVDF-g-PAN does not come into contact with such an anode, as reactions would occur. In one arrangement, a non-PVDF-g-PAN electrolyte is used between the anode and cathode. In another arrangement, multiple electrolyte layers are used to ensure that the anode is in contact only with an electrolyte with which it is stable. A second electrolyte layer in contact with the cathode may contain PVDF-g-PAN. The cell may also include current collectors in electronic communication with the anode and/or the cathode.

Examples of cathode active materials that can be used with PVDF-g-PAN include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \leq x \leq 1.1$; and y is described by $0 \leq y \leq 0.5$. In one arrangement, the positive electrode material is $LiNi_{0.5}Mn_{0.5}O_2$.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \leq x \leq 1.1$; and y is described by $0 \leq y \leq 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \leq x \leq 1.1$; and y is described by $0 \leq y \leq 2$. In another arrangement, the positive electrode active material is described by the general formula: $Li_xM_yMn_{4-y}O_8$, where M is chosen from Fe and/or Co; x is described by $0.05 \leq x \leq 2$; and y is described by $0 \leq y \leq 4$. In another arrangement, the positive electrode active material is given by the general formula $Li_x(Fe_yM_{1-y})PO_4$, where M is chosen from transition metals such as Mn, Co and/or Ni; x is described by $0.9 \leq x \leq 1.1$; and y is described by $0 \leq y \leq 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \leq x \leq 0.2$. In some arrangements, the positive electrode material includes $LiNiVO_2$.

Examples of other solid anode active materials include, but are not limited to any material that can serve as a host material (i.e., can absorb and release) the active ions of the cell. Examples of materials that can serve as host material for Li ions include, but are not limited to graphite, lithium metal, and lithium alloys such as Li—Al, Li—Si, Li—Sn, and Li—Mg. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials. As stated above, multiple electrolyte layers can be used to ensure that the anode is in contact only with an electrolyte with which it is stable. Examples of electrolytes appropriate for use against such anodes include, but are not limited to, any one or more of carbonates, ethers, polyethers, and ionic liquids. A second electrolyte layer in contact with the cathode, but not with the anode, may contain PVDF-g-PAN.

EXAMPLES

The following examples provide details relating to composition, fabrication and performance characteristics of PVDF-g-PAN in accordance with the embodiments of the present invention. It should be understood the following is representative only, and that the invention is not limited by the detail set forth in these examples.

Example 1

Commercially-available PVDF (10 g, molecular weight 1000 kD) was dissolved in 50 ml NMP (N-Methyl-2-pyrrolidone) and 20 ml acrylonitrile, and the solution was sparged in argon for 2 hr. Then CuCl$_2$ (6 mg) and Me$_6$Tren (10 μl) in DMF (dimethylformamide) (5 ml) was added into the solution. Later, Tin (II) 2-ethylhexanoate (100 mg) and Me$_6$Tren (100 μl) in DMF (5 ml) was added. The reaction was carried out under Ar gas at 100° C. for 18 hours. The solution was precipitated in IPA (isopropyl alcohol). After filtering and drying, the final product was obtained.

Example 2

Commercially-available PVDF (5 g, molecular weight 71 kD), CuCl (60 mg), and 4,4'-Dimethyl-2,2'-dipyridyl (345 mg) were added to 50 mL NMP (N-Methyl-2-pyrrolidone) and 55 mL acrylonitrile. The mixture was sparged in argon for 1 hour and then was held at 90° C. with stirring for 20 hours. The reaction mixture was allowed to cool to room temperature and was then precipitated in water/ethanol. The resulting polymer was dried, dissolved in NMP (10 mL) and precipitated in NaSCN solution (30% in water, 80 mL). After filtering and drying, the final product was obtained. About 11 wt % of acrylonitrile had been grafted onto PVDF according to analysis by NMR.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A material, comprising a polyvinylidene fluoride molecule that has one or more grafted polar groups selected from the group consisting of poly(2-cyanoethyl acrylate), polyalylnitrile, and polyvinylsulfone.

2. An electrochemical cell, comprising:
   an anode;
   a cathode comprising particles of cathode active material; and
   an ionically conductive polymer binding the cathode active material particles together, the polymer comprising acrylonitrile grafted to polyvinylidene fluoride (PVDF-g-PAN); and
   a salt;
   a first electrolyte layer adjacent to the anode, the first electrolyte layer stable against the anode; and
   a second electrolyte layer between the cathode and the first electrolyte layer, the second electrolyte layer comprising PVDF-g-PAN and a salt.

3. The cell of claim 2 wherein the first electrolyte layer is a non-PVDF-g-PAN electrolyte.

4. The cell of claim 2 wherein the negative electrode active material is selected from the group consisting of graphite, lithium metal, Li—Al, Li—Si, Li—Sn, Li—Mg, Si, Si—Sn, Si—Ni, Si—Cu, Si—Fe, Si—Co, Si—Mn, Si—Zn, Si—In, Si—Ag, Si—Ti, Si—Ge, Si—Bi, Si—Sb, Si—Cr, metal oxides, silicon oxides, silicon carbides, and mixtures thereof.

5. The cell of claim 2 wherein the first electrolyte comprises one or more selected from the group consisting of carbonates, ethers, polyethers, and ionic liquids.

* * * * *